United States Patent [19]

Goldberg et al.

[11] Patent Number: 4,584,707
[45] Date of Patent: Apr. 22, 1986

[54] CORDLESS COMMUNICATIONS SYSTEM

[75] Inventors: Joshua I. Goldberg, Woodbridge; Benjamin G. Lardiere, Jr., Milford; Bruce E. McCoy, Prospect; John J. Riter, Jr., Meriden, all of Conn.

[73] Assignee: Dataproducts New England, Inc., Wallingford, Conn.

[21] Appl. No.: 693,114

[22] Filed: Jan. 22, 1985

[51] Int. Cl.⁴ .............................................. H04B 5/02
[52] U.S. Cl. ........................................ 455/41; 179/82; 455/54
[58] Field of Search ...................... 455/41, 54, 55, 78; 179/82; 178/43

[56] References Cited

U.S. PATENT DOCUMENTS

| | | | |
|---|---|---|---|
| 2,574,167 | 11/1951 | Breisch | 455/41 |
| 3,078,348 | 2/1963 | McIntosh | 179/82 |
| 3,426,278 | 2/1969 | Van Der Valk | 455/41 |
| 3,803,366 | 4/1974 | Ishii et al. | 455/55 |
| 4,117,271 | 9/1978 | Teeter et al. | 179/82 |
| 4,136,338 | 1/1979 | Antenore | 179/82 |

FOREIGN PATENT DOCUMENTS 1043822 9/1966 United Kingdom .................. 179/82

Primary Examiner—Marc E. Bookbinder
Attorney, Agent, or Firm—Bachman & LaPointe

[57] ABSTRACT

A cordless communications system wherein transmission is made and received via magnetic lines of induction comprises a base station and at least one mobile station wherein the base station receives and transmits voice or data signals at different frequencies. The base station employs at least two magnetic loop antennas for transmission and reception, respectively, oriented so as to provide a toroidal magnetic field which allows 360 degree transmission and reception in the planes of the antennas. The components of the at least one mobile station are mounted in an article of clothing. The mobile station is arranged in the article of clothing in such a manner as to insure a substantially constant effective coupling area with the base station antenna.

9 Claims, 6 Drawing Figures

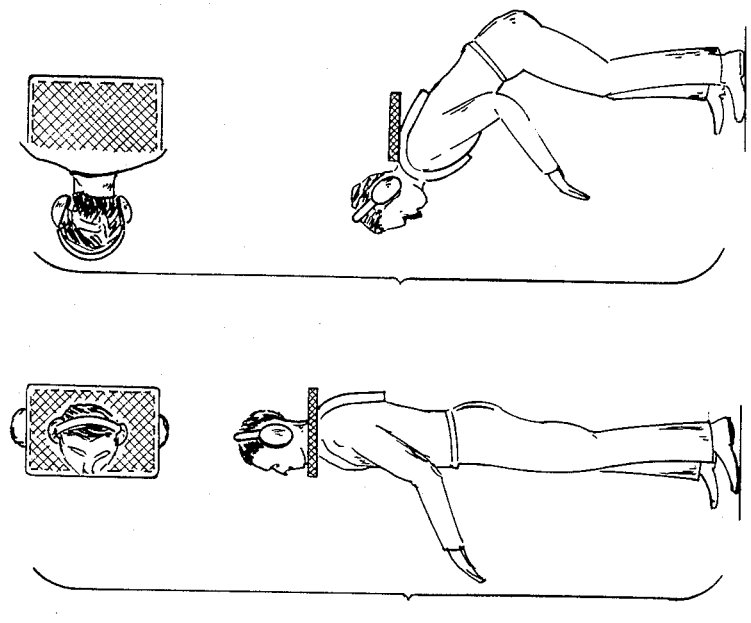
FIG-3A  FIG-3B
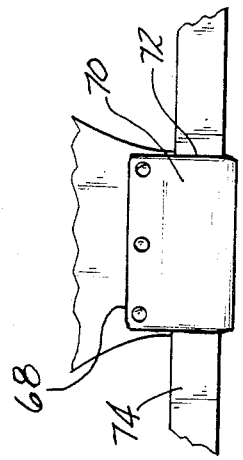
FIG-5
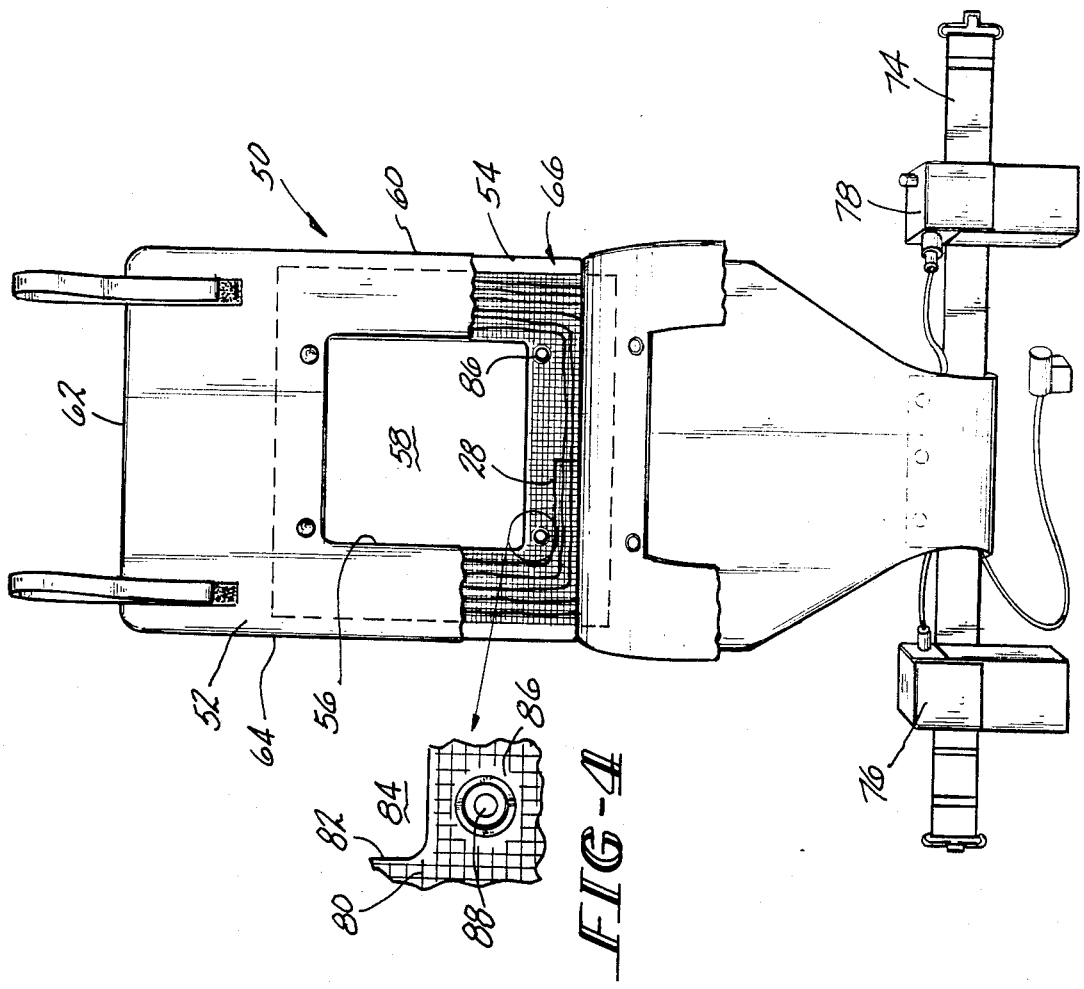
FIG-4
FIG-2

CORDLESS COMMUNICATIONS SYSTEM

BACKGROUND OF THE INVENTION

The present invention relates to a cordless communications system and, more particularly, to a cordless communications system wherein transmission is made between crew stations and a base station via magnetic lines of induction.

Conventional communications systems which employ generally known radio frequency techniques are not particularly suitable for military use where a high degree of security is desired. For example, with conventional HF and VHF walkie-talkies interference with existing radio, radar, navigation and ECM equipment is likely to occur. In addition, as an electrical field loses strength as the square of the distance from the transmitter, it is possible for communications to be intercepted. Furthermore, walkie-talkie systems presently employed experience numerous "blind spots" which result from (1) the inability of the electrical field to penetrate conductive materials and/or (2) re-radiation from conductive materials creating destructive interference. Finally, conventional radio frequency components used in known walkie-talkies are generally expensive and prone to failure.

Naturally, it would be highly desirable to provide a communications system which is intrinsically difficult to jam, eliminates interference with existing electronic equipment and has a high degree of security. Additionally, the communications system should be relatively compact, inexpensive and, in the case of crew stations, comfortable for the user.

Accordingly, it is the principal object of the present invention to provide a cordless communications system wherein transmission is made and received via magnetic lines of induction so as to provide an inherent high degree of security and elminates virtually all blind spots.

It is a further object of the present invention to provide a cordless communications system which is virtually impossible to jam.

It is a particular object of the present invention to provide a cordless communications system which is compact, readily portable and comfortable for the user to wear.

It is a still further object of the present invention to provide a cordless communications system having a crewset loop antenna which allows for freedom of movement while maintaining good magnetic coupling with the base station.

Further objects and advantages will appear hereinbelow.

SUMMARY OF THE INVENTION

In accordance with the present invention the foregoing objects and advantages are readily obtained.

The present invention relates to a cordless communications system and, more particularly, to a cordless communications system wherein transmission is made and received via magnetic lines of induction. The communications system of the present invention comprises a base station and at lease one mobile station. The base station has at least two magnetic loop antennas for transmitting and receiving first and second voice or data signals, respectively at different frequencies. In a preferred embodiment of the present invention, the magnetic loop antennas are oriented so as to provide a toroidal magnetic field which allows for 360° transmission and reception of magnetic signals in the planes of the antennas. The mobile station is provided with a magnetic loop antenna which is coupled to an antenna switch for transmitting and receiving the voice or data signals to and from the base station. The antenna switch is normally in its receiving mode and is actuated to transmitting mode by a push to talk switch or button. The mobile station is battery powered.

In accordance with a principal feature of the present invention, the transceiver pack, battery pack and antenna of the mobile station are mounted in an article of clothing or the like which is adapted to be worn on the torso of a wearer. The antenna is incorporated in the article of clothing in such a manner as to insure that the antenna rests on the chest, arms, shoulders and back of the wearer so that the effective coupling area of the antenna with the base station antenna remains substantially constant irregardless of the posture, position and orientation of the wearer.

The communications system of the present invention offers significant advantages over those devices heretofore known. First of all, by using magnetic lines of induction to couple the mobile station or stations to the base station, a number of unique features are obtained. The ability of the magnetic lines of force to follow ferromagnetic materials and emerge undistorted enhances the systems ability to convey informational signals. Additionally, the ability of the magnetic lines of flux to follow around conductive non-magnetic materials eliminates virtually all blind spots which are experienced with conventional HF and VHF walkie-talkies. The ability to follow non-magnetic materials, such as aluminum, is particularly useful in airplanes where crew communication is desired. Furthermore, as the magnetic field loses strength as the cube of the distance from the transmitter, the system is capable of only close in communications thereby resulting in an inherent high degree of security. In addition, as a result of the rapid decrease in signal strength, remote jamming of communications is virtually impossible as any antenna which would be capable of generating field strengths of sufficient magnitude to prevent communications would be absurdly large. Finally, the use of coils as magnetic dipoles enhance their resistance to outside electromagnetic interference because the spatial orientations of the B and E fields in the propagating wave generated by magnetic dipoles are reversed relative to those broadcast by conventional electronic dipoles.

In addition to the foregoing, by providing a user oriented article of clothing for mounting the transceiver pack, battery pack and antenna of the mobile station further advantages are obtained. Firstly, the wearer is more comfortable. Secondly, and more importantly, by incorporating the antenna in the article of clothing so that the antenna lies on the chest, arms, shoulder and back of the wearer one can insure that the effective coupling area of the antenna with the base antenna remains constant irregardless of the wearer's position, posture and/or orientation so as to maintain good communications between the base and mobile stations.

Further advantages of the present invention will appear hereinafter.

BRIEF DESCRIPTION OF THE DRAWINGS

FIG. 2 is a partial sectional view of an embodiment of clothing incorporating some of the features of the present invention.

FIGS. 3A and 3B are schematic illustrations showing the effective coupling area of the antenna illustrated in FIG. 2 when the wearer is in various working positions.

FIG. 4 is a partial sectional view showing one embodiment for holding the antenna in place in the clothing of FIG. 2.

FIG. 5 is a partial rear view showing the mechanism for holding the belt to the vest of FIG. 2.

DETAILED DESCRIPTION

Figure 1:
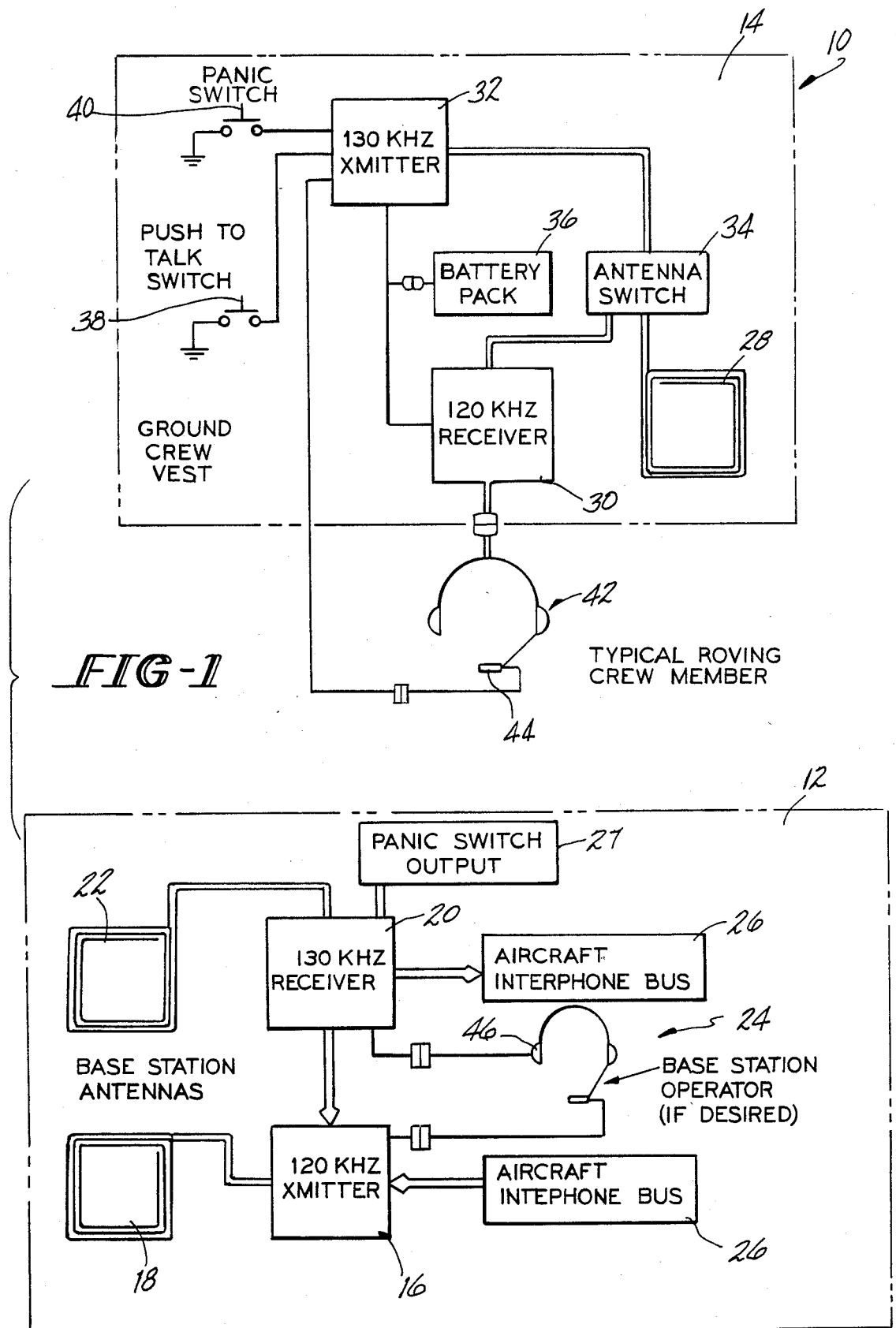
FIG. 1 is a schematic block diagram illustrating the cordless communications system of the present invention.

With reference to FIG. 1, the cordless communications system of the present invention will be described in detail. The communications system 10 comprises a base station 12 and at least one mobile station 14. In an aerospace environment, for example, the base station 12 might be located at the navigator's station in the airplane and the mobile stations 14 would typically be roving crew members. The base station 12 consists of a transmitter 16 coupled to a first magnetic loop antenna 18 for transmitting a first modulated voice or data signal to the mobile station 14 at a first operating frequency, for example, 120 KHZ. The base station 12 further includes a receiver 20 which is coupled to a second magnetic loop antenna 22 for receiving a second modulated voice or data signal from the mobile station 14 at a second frequency different from the first frequency, for example, 130 KHZ. The receiver 20 is also coupled to transmitter 16 for reasons to be explained hereinbelow. As shown in FIG. 1, the base station 12 may be operated by a base station operator 24 and/or be used to connect an intercom or other radio system 26 thereto.

In accordance with a particular feature of the present invention, the magnetic loop antennas are oriented so as to provide a toroidal magnetic field which allows for 360° transmission and reception of magnetic signals in the plane of the antennas. Alternatively, the base station 12 may be provided with additional transmit and receive antennas, not shown, the placement of which can serve to increase the range of the system, modify the allowed field of operation or both.

Mobile station 14 comprises an antenna 28 which is selectively coupled to either a receiver 30 or transmitter 32 by way of an antenna switch 34. In accordance with the present invention, mobile receiver 30 and transmitter 32 operate at the same operating frequencies as base station transmitter 16 and receiver 20, respectively, that is, for example, 120 KHZ and 130 KHZ. The mobile station 14 is powered by means of a battery pack 36. Antenna switch 34 is moved from its first operative position where it couples antenna 28 with receiver 30 to its second operative position where it couples antenna 28 with transmitter 32 by means of push to talk switch 38. Mobile station 14 includes a panic switch 40 for transmitting an amplitude modulated signal to the base station. This signal is detected by the base station receiver prior to any limiting stages to ensure detection of the panic switch signal even in the presence of other transmitted signals. When this panic switch signal is detected, the base station transmits a raucous tone to all mobile stations and outputs a discrete signal 27 available at the base station.

The operation of the communication system of the present invention is as follows. Pressing the push to talk switch 40 of mobile unit 14 places the system in its transmit mode by coupling transmitter 32 to antenna 28. The operator 42 then speaks into microphone 44 to transmit the desired information to base station 12. The transmitter 32 operates using a frequency modulation of a crystal controlled carrier as is known in the art. When the push to talk switch 40 is released, antenna switch 34 couples antenna 28 to receiver 30 so as to place mobile station 14 in its receive mode where information being transmitted from the base station 12 is received, demodulated and heard by the operator 42 in the head set 46. The mobile station 14 transmits directly to base station 12. When a plurality of mobile stations 14 are employed all stations 14 transmit only to base station 12 and not to each other and likewise receive transmissions only from base station 12.

Base station 12 is set up to both transmit and receive from mobile station 14 at the same time. When the base station 12 receives a signal from a mobile station 14 in receiver 20, the information is demodualted and then used to modulate the base station transmitter 16 thus passing the information along to the other mobile stations 14 if any. Thus, the base station 12 operates unattended and transparently to the mobile station 14 in the system. Additionally, the base station 12 can be used to connect to an intercom 26 as well as allows usage by an operator 24 located at the base station 12.

In accordance with a particular feature of the present invention, the components of mobile station 14 are preferably mounted in an article of clothing or the like so as to provide the wearer communications ability without impeding mobility. A suitable arrangement for mounting the components is illustrated in FIG. 2 as is in the form of a poncho-style vest assembly 50. While the principles of the present invention will be described with reference to vest assembly 50 it should be appreciated that the instant invention is not restricted to a vest and the components could be mounted in other apparel such as life jackets, jump suits or the like.

With reference to FIG. 2, the vest assembly 50 comprises first and second substantially rectangular sheets of fabric 52 and 54, respectively each provided with a central edge portion 56 defining an opening 58 adapted to receive the head and neck of a wearer. The sheets 52 and 54 are secured together on their three outside edges 60, 62 and 64 by means of stitching or the like so as to form a hollow compartment 66 therebetween. The fourth outside edge 68 is closed by fold flap 70 on sheet 52 over and securing it to sheet 54 by means of clips, velcro seals or the like so as to define a loop 72 which is adapted to receive a belt 74. Secured to belt 74 are compartments 76 and 78 which the transceiver pack and battery pack of mobile station 14 are located.

In accordance with the present invention, a non-conductive screen of material 80 such as nylon or the like is provided with a central edge portion 82 defining an opening 84. Screen 80 is provided with four cut-outs 86 which receive clips 88 provided on sheets 52 and 54 for holding the screen 80 in place between sheets 52 and 54 such that openings 58 are in line with opening 84. Secured to screen 80 is the antenna coil 28 of mobile station 14. The antenna coil 28 is located on screen 80 in such a manner that, when vest assembly 50 is on the wearer, the antenna rests on the chest, arms, shoulders and back of the wearer so as to insure that the effective coupling area of the antenna remains substantially constant, irregardless of the position and orientation of the wearer, see FIG. 3. By using a screen material 80 the coil antenna is adequately supported while at the same time allowing the coil to breath so that the vest assembly does not become excessively warm for the wearer.

As noted above, the cordless communications system of the present invention offers significant improvements over systems heretofore known.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A cordless communications system wherein transmission is made and received via magnetic lines of induction comprising:

a base station and at least one mobile station;

said base station having a first magnetic loop antenna and a second magnetic loop antenna wherein said first and second magnetic loop antennas are each oriented so as to provide a individual toroidal magnetic fields each of which allows for 360° transmission and reception of magnetic signals in the plane of said first magnetic loop antenna and said second magnetic loop antenna respectively, transmitting means coupled to said first magnetic loop antenna for transmitting a first modulated signal to said at least one mobile station at a first operating frequency, receiving means coupled to said second magnetic loop antenna for receiving and demodulating a second modulated signal from said at least one mobile station at a second operating frequency different from said first operating frequency; and said at least one mobile station having a mobile magnetic loop antenna coupled to an antenna switch having first and second operating positions, mobile receiving means coupled to said mobile magnetic loop antenna when said antenna switch is in said first position for receiving said first modulated signal from said base station at said first operating frequency, mobile transmitting means coupled to said mobile magnetic loop antenna when said antenna switch is in said second position for transmitting said second signal to said base station at said second operating frequency and means for switching said antenna switch from said first position to said second position when transmitting.

2. A cordless communications system according to claim 1 wherein said at least one mobile station is battery powered by means of a battery pack.

3. A cordless communications system according to claim 1 wherein a panic button is coupled to each of said at least one mobile station transmitting means for transmitting an amplitude modulated signal which is received by said base station.

4. A cordless communications system according to claim 2 wherein said mobile transmitting means and mobile receiving means are mounted in a transceiver pack and, said transceiver pack, battery pack and antenna are mounted on an apparel to be carried on the torso of a wearer.

5. A cordless communications system according to claim 4 wherein said at least one mobile station antenna is incorporated into the apparel such that said antenna rests on the chest, arms, shoulders and back of a wearer such that the effective coupling area of said at least one mobile station antenna remains substantially constant irregardless of the posture, position or orientation of the wearer, so as to maintain good coupling with said base station antennas.

6. A cordless communications system according to claim 4 wherein said apparel comprises a vest having a belt secured thereto, said belt being provided with means for receiving said transceiver pack and said battery pack.

7. A cordless communications system according to claim 1 wherein said base station is provided with additional magnetic loop antennas for modifying the shape of the magnetic field.

8. A cordless communications system according to claim 1 wherein said base station is provided with means for connecting means to an intercom system.

9. A cordless communications system according to claim 5 wherein a screen of non-conductive material is secured in said apparel and said antenna is mounted on said screen.

* * * * *